United States Patent Office

2,876,256
Patented Mar. 3, 1959

2,876,256

CHLORINATED CYCLODIENE ACID AND PROCESS OF MAKING IT

Joseph F. Nelson, Westfield, and John F. McKay, Cranford, N. J., assignors to Esso Research and Engineering Company, a corporation of Delaware No Drawing. Application September 22, 1955
Serial No. 536,012

5 Claims. (Cl. 260—514)

This invention relates to halogenated cyclodiene carboxylic acids and to a process of making them. More particularly it relates to substantially saturated halogenated derivatives of polycyclodiene polycarboxylic acids such as chlorinated derivatives of dicyclopentadiene dicarboxylic acid. The invention also relates to the preparation of such derivatives by the addition of liquid chlorine.

Carboxylated derivatives of cyclodienes such as dicyclopentadiene dicarboxylic or the corresponding derivatives of methylcyclopentadiene are materials which have been previously described. A convenient method for their preparation is given, for example, in copending application Ser. No. 268,122, filed January 24, 1952, by Cohen et al., now Patent No. 2,716,662. Related materials obtained by reaction of the dicyclodiene dicarboxylic acids with dicyclodiene hydrocarbons, with maleic anhydride, or with various other dienophilic compounds are also known and described in copending applications Serial Nos. 498,748, 498,749, and 498,750, now abandoned, all filed on April 1, 1955. Dicyclopentadiene dicarboxylic acid and the other aforementioned carboxylated derivatives have been gaining increasing acceptance as substitutes for more conventional carboxylic acids such as phthalic acid, e. g. in the preparation of alkyd resins. However, in some instances, the previously known materials have not been found entirely satisfactory, apparently due to their relatively high unsaturation.

It has now been found that the previously noticed shortcomings can be substantially eliminated by chlorinating or brominating the carboxylated cyclodiene derivatives so as to saturate most of the double bonds, provided that the halogenation is effected under suitable controlled conditions as specified below. For instance, when an attempt was made to chlorinate dicyclopentadiene dicarboxylic acid with gaseous chlorine at temperatures of about 25° C. in the presence of an organic solvent such as carbon tetrachloride, the acid number of the product showed that no reaction occurred. The ineffectiveness of such a system is undoubtedly attributable to the poor solubility of the dicarboxylic acids in most organic solvents and hence the resultant poor contact.

In contrast, it has now been found that substantially completely saturated products of excellent color can be produced by treating the cyclodiene carboxylic acids with liquid chlorine or bromine, or high concentrations thereof in suitable liquid solvents such as halogenated aliphatic acids, e. g., trichloroacetic or pentafluoropropionic acids. For purposes of convenience, chlorine and bromine may be hereafter referred to by the generic designation "halogen having an atomic weight between 35 and 80."

The invention is particularly applicable to the chlorination of unsaturated dicyclodiene dicarboxylic acids such as dicyclopentadiene dicarboxylic acid, dimethyldicyclopentadiene dicarboxylic acid, methyldicyclopentadiene dicarboxylic acid, their maleic anhydride adducts, and the other aforementioned derivatives thereof. It is likewise applicable to the corresponding alkyl esters obtained by esterifying any of the aforementioned acid compounds by methanol, butanol or any other $C_1$ to $C_4$ alkanol.

Accordingly these polynuclear diene acids or esters or derivatives thereof which are useful herein may have a molecular weight of about 200 to 400, and one to two double bonds and 2 to 3 carboxyl groups per molecule.

According to the present invention, compounds of the type specified above can be readily halogenated in such a manner that at least 85% and up to 100% of the double bonds initially present become saturated with the halogen, resulting in a carboxylic acid containing about 35 to 60% halogen and an unsaturation equivalent to a bromine number of less than about 25 cg. bromine per gram, preferably less than about 5 cg. Br per gram. Depending on the number of double bonds originally present and the kind of halogen used, the product may have a molecular weight between about 320 and 720.

An essential feature of the present invention is that the aforementioned unsaturated carboxylic acids are halogenated in liquid phase, preferably with the aid of liquid chlorine. In the reaction mixture it is preferable to use an excess of halogen, i. e. about 1.1 to 5 moles of halogen per each double bond of the organic polynuclear carboxylated reagent being halogenated. A large excess of liquid halogen, e. g. about 5 to 15 moles of chlorine per mole of diene acid, is particularly desirable when no extraneous solvent is present since in such a case the excess liquid halogen itself serves as a liquid reaction medium. The reaction temperature is desirably maintained in the range of about 0° to 60° C., preferably at about 15 to 30° C. and the pressure may accordingly range from about 1 to 15 or 18 atmospheres; that is, a sufficient pressure is maintained on the system to keep the halogen in the liquid phase. Higher temperatures, e. g. 100° C., have been found unsuitable for the present purposes.

In brief, a convenient way of preparing the novel products from the unsaturated cyclodiene acid may comprise suspending the latter in finely divided form in liquid chlorine at a low temperature of about −35° C. or lower in a bomb or equivalent pressure vessel, whereupon the vessel may be closed, and allowed to warm to room temperature. As a result the pressure will rise to about 100 p. s. i. g. If a faster reaction rate is desired, the reaction vessel may be heated to say 50° C., with or without agitation of the contents. When so heated, the pressure may rise to about 14 or 15 atm. When the desired degree of chlorination is attained, usually after a period of about 20 to 100 hours, the vessel may be cooled below the boiling point of chlorine, −35° C., opened, and the chlorine allowed to boil off. Alternately, the chlorine may be bled off carefully at room temperature or even at higher reaction temperatures. When a purified white cyclodiene acid is used to begin with, the saturated, chlorinated product obtained is a granular material which is white when powdered.

While the exact structure of the various carboxylated cyclodiene compounds is somewhat uncertain, particularly with respect to the exact location of the carbonyl groups in the molecule, their empirical formulas have been definitely established and latest data indicate that the carboxyl groups are attached to carbon atoms which are adjacent to the double bonds. Thus, the structural formula for dicyclopentadiene dicarboxylic acid can be written as follows:

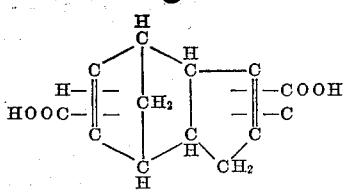

While several isomers of this type are possible, the sharp melting point of the prepared compounds indicates that they consist largely, or perhaps exclusively, of a single specific isomer.

The formulas for dimethyldicyclopentadiene dicarboxylic acid, the esters thereof, and the aforementioned adducts of the cyclopentadiene carboxylic acids with unsaturated dienophilic carboxylic compounds such as maleic anhydride can be readily derived from the foregoing formula by making the appropriate substitutions therein. In any event, the true structural formula of the compounds involved is of no particular importance either to the operation or the understanding of this invention and the latter, therefore, is not to be necessarily limited to the specific hypothetical formula just disclosed.

A typical example will now be described for purposes of illustrating the operation of this invention. In the absence of contrary indications it will be understood that all amounts, proportions and percentages of materials are expressed on a weight basis throughout this entire specification and appended claims.

*Example 1*

50 g. (0.23 mole) of pure dicyclopentadiene dicarboxylic acid was placed in a chilled, glass-lined, 1-liter stainless steel bomb, 240 g. (3.37 moles) of liquid chlorine chilled to Dry Ice temperature was added and the bomb was quickly capped. The dicyclopentadiene dicarboxylic acid, $C_{10}H_{10} \cdot (COOH)_2$, had a melting point of 203° C. and a bromine number of 145 cg.Br/g., the latter being indicative of the presence of the two double bonds per molecule. The closed bomb was then allowed to warm up to room temperature, about 25° C., the pressure being raised to 115 p. s. i. g. by the concomitant evaporation of about 21 g. of the chlorine charged. Since only two moles of chlorine are needed per mole of the diene acid in order to produce the desired tetrachloro derivative, it is apparent that a large excess of chlorine was present in the charge as a liquid even at room temperature.

The reaction mixture was allowed to stay in the bomb at 25° C. for 72 hours, without agitation, whereupon excess chlorine was bled off, the bomb was opened, and the resulting granular product powdered and degassed by spreading on glass for 48 hours. Finally, the product was dried in the vacuum oven for 2 hours at 90° C. 84 g. of white product was thus recovered; this is equivalent to a yield of 102% of the tetrachloro acid, $$C_{10}H_{10}Cl_4(COOH)_2$$

based on the original diene acid.

The following analytical data were obtained on the tetrachloro acid product:

Melting point (Bar Method)_____ 163–167° C.
Bromine No., Cg. Br/g_____ 0.85 (Theoretical, 0).
Acid No., mg. KOH/g_____ 300 (Theoretical, 309).

| Elemental Analysis | Theoretical for Tetrachloro Acid, percent | Found by Analysis, percent | Percent of Theor. |
|---|---|---|---|
| C | 39.80 | 40.13 | 100.1 |
| H | 3.32 | 3.55 | 107.0 |
| O | 17.69 | 17.50 | 99.9 |
| Cl | 39.19 | 39.11 | 99.9 |
| Total | 100.00 | 100.29 | |

It is thus apparent that the double bonds present in the original acid were substantially completely saturated by addition of chlorine, while the absence of any hydrogen chloride odor in the product as well as the analytical data simultaneously indicated that the chlorination was exclusively in the form of addition to the double bonds, rather than by substitution. Because of its high chlorine content the product of this invention is especially desirable in formulating alkyd resins of superior flame resistance.

The scope of the present invention is particularly pointed out in the appended claims when read in the spirit of the foregoing general description and the illustrative example.

What we claim is:

1. A chlorinated derivative of a dicyclopentadiene dicarboxylic acid compound selected from the group consisting of dicyclopentadiene dicarboxylic acid, methyl dicyclopentadiene dicarboxylic acid, dimethyl dicyclopentadiene dicarboxylic acid, and $C_1$ to $C_4$ alkyl esters thereof, said chlorinated derivative having the following chlorinated carboxylated cyclic structure.

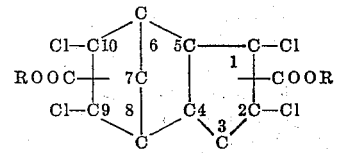

wherein R is a radical selected from the group consisting of hydrogen and $C_1$ to $C_4$ alkyl groups and wherein one carboxy group is attached to a carbon atom selected from the 1 and 2 carbons and the other carboxy group is attached to a carbon atom selected from the 9 and 10 carbons.

2. A tetrachlorinated derivative of dicyclopentadiene dicarboxylic acid represented by the formula

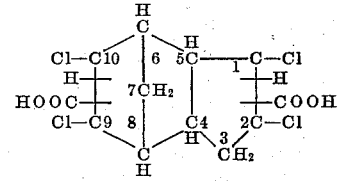

wherein one of the carboxyl groups is attached to a carbon atom selected from the 1 and 2 carbons, and the other carboxyl group is attached to a carbon atom selected from the 9 and 10 carbons.

3. A process for preparing substantially saturated derivatives of an unsaturated dicyclopentadiene dicarboxylic acid compound selected from the group consisting of dicyclopentadiene dicarboxylic acid, methyl dicyclopentadiene dicarboxylic acid, dimethyl dicyclopentadiene dicarboxylic acid, and $C_1$ to $C_4$ alkyl esters thereof, which comprises mixing said unsaturated acid compound with chlorine in a ratio of about 2.2 to 10 moles of the chlorine per mole of acid compound, maintaining the mixture at a temperature between 0° C. to 60° C. and at a pressure to maintain the chlorine in liquid phase, these reaction conditions being maintained until a saturated derivative is formed having the chlorinated carboxylated cyclic formula

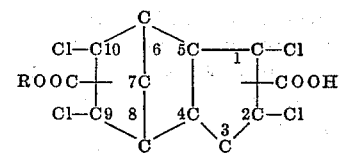

wherein R is a radical selected from the group consisting of hydrogen and $C_1$ to $C_4$ alkyl groups and wherein one carboxy group is attached to a carbon atom selected from the 1 and 2 carbons and the other carboxy group is attached to a carbon atom selected from the 9 and 10 carbons.

4. A process according to claim 3 wherein the chlorine is the only solvent present in the reaction mixture.

5. A process of preparing a tetrachlorinated derivative of dicyclopentadiene dicarboxylic acid having the formula

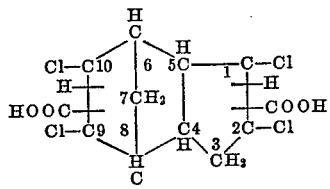

wherein one of the carboxyl groups it attached to a carbon atom selected from the 1 and 2 carbons and the other carboxyl group is attached to a carbon atom selected from the 9 and 10 carbons which comprises mixing dicyclopentadiene dicarboxylic acid with an excess of liquid chlorine, maintaining the resulting mixture at a temperature between about 0° and 30° C. and at a pressure sufficient to maintain the chlorine in liquid phase, these reaction conditions being maintained for a period sufficient to result in a product having a bromine number of less than 1 cg. Br per gram, and separating the chlorinated product from the reaction mixture.

References Cited in the file of this patent

UNITED STATES PATENTS

| | | |
|---|---|---|
| 2,550,744 | Wilder et al. | May 1, 1951 |
| 2,635,979 | Lidov | Apr. 21, 1953 |
| 2,716,662 | Cohen et al. | Aug. 30, 1955 |
| 2,719,868 | Konz et al. | Oct. 4, 1955 |
| 2,781,395 | Wiese | Feb. 12, 1957 |
| 2,781,397 | Wiese et al. | Feb. 12, 1957 |

OTHER REFERENCES

Hickinbottom: "Reactions of Organic Compounds, p. 24 (1948).